Jan. 23, 1923. 1,442,905.
C. S. PRESTON.
VEHICLE TIRE.
FILED NOV. 22, 1920.

Inventor:
Clarence S. Preston,
by Edcomb Bro's
Attys.

Patented Jan. 23, 1923.

1,442,905

UNITED STATES PATENT OFFICE.

CLARENCE S. PRESTON, OF SAN DIEGO, CALIFORNIA.

VEHICLE TIRE.

Application filed November 22, 1920. Serial No. 425,830.

*To all whom it may concern:*

Be it known that I, CLARENCE S. PRESTON, a citizen of the United States, residing at San Diego, in the county of San Diego and State of California, have invented certain new and useful Improvements in Vehicle Tires; and I do hereby declare the following to be a full, clear, and exact description of the invention, such as will enable others skilled in the art to which it appertains to make and use the same.

This invention relates to vehicle tires of that class known as solid resilient tires, as distinguished from the well known pneumatic tires.

The principal object of my invention is to provide a tire of the solid type with certain diverging annular voids therein and a transverse bridge spanning the upper edges of the voids and having obliquely disposed end members, that is, members which diverge from a middle portion of the bridge outwardly toward the sides and the tread of the tire, and serve as suspending members for carrying the load or taking up road shock, also to provide for resilience by interior expansion or bulge of the solid material, rather than exterior lateral bulge, when the tread portion is subjected to pressure by a load during travel of the vehicle, so as to avoid cutting or undue wear at the junction of the tire with the clencher rim.

A special object of my invention is to provide, in connection with the above-mentioned annular voids and an inner pneumatic channel, a transverse annular bridge spanning the inner edges of the voids, and a central load sustaining portion between the voids, said bridge having end portions extending obliquely outward toward the sides of the tire and tread, which end portions will be put under strain or tension in the direction of their long axes when subjected to pressure of a load on the tread through said load sustaining portion, and will therefore act to draw inwardly the opposite sides of the tire, rather than cause them to bulge or spread outwardly and be thereby subjected to cutting by the clencher rim.

In the above stated object, it is to be understood that when the central load sustaining portion is pushed inwardly by pressure of a load on the tread, the middle part of the bridge will be pushed inwardly into the inner air channel, thereby putting the oblique end portions of the bridge under tension in the direction of their long axes, and acting to draw inwardly the opposite sides of the tire. This special construction of the bridge, with obliquely disposed end portions and diverging annular voids, acting as described, are the distinguishing features of my invention.

I wish it understood that I preferably provide two opposite diverging annular elongated voids or spaces, one on each side of a radial line drawn from the inner periphery to the middle portion of the tread, and that these voids may be divergent at any desired angle from near the inner pneumatic channel outwardly in the general direction of the tread portion of the tire, but so disposed as to leave a solid central load sustaining portion between them. The voids are preferably elongated on approximately radial lines to provide an increased cushioning effect and resiliency of a solid type of tire by permitting interior displacement or bulge of the solid material as distinguished from exterior lateral bulge of such material. Furthermore I provide adjacent to the inner pneumatic channel a transverse bridge spanning the inner edges of the voids and having sections or members extending obliquely toward the opposite sides and tread of the tire. Under action of a load on the tread portion the central solid portion between the voids will be forced inwardly at the middle portion of the bridge and thereby place the oblique sections under strain or tension which will operate to suspend the load and draw inward the opposite sides of the tire, rather than permit lateral spreading and crushing down under a heavy load, or by repeated contact with obstacles. Though my tire possesses the desired resilience and cushioning effect, it will be substantially non-puncturable; it is a one piece structure and, therefore, simple to manufacture and convenient to operate; it cannot flatten and be made liable to skid, and is not liable to be cut and worn by the rim.

The matter constituting my invention will be defined in the claim.

I will now describe more in detail modified constructions illustrating my invention, by reference to the accompanying drawings, in which—

Figure 1:
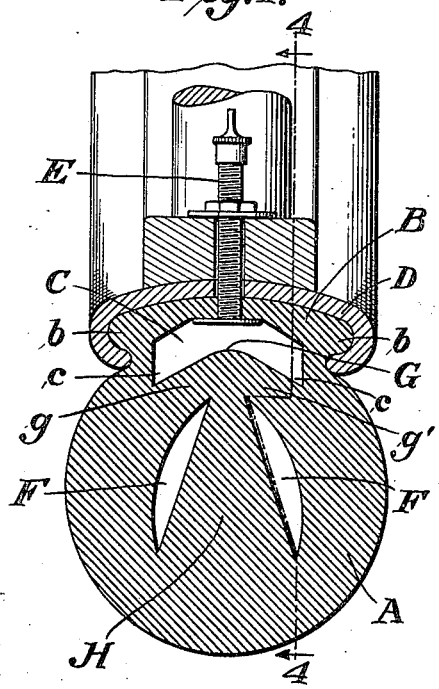
Figure 1 represents a transverse section of my tire mounted on a clincher rim.
Figure 2:
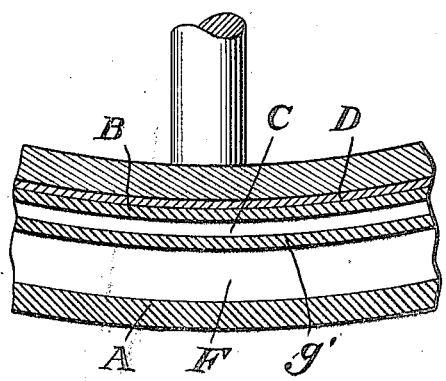
Fig. 2 represents a section on line 4—4, Fig. 1, showing a short arc of a tire embodying my invention.

My solid type of tire A is approximately circular in cross section and is formed with an inner peripheral rim engaging extension B provided with annular side beads $b, b$. This portion B is made with an annular air channel C, with which connects the stem E of an air inlet having the usual valve. The beads $b$ will be engaged by the clencher rim D in a known manner. In order to provide for readily engaging the rim portion B with the rim, the deflatable or collapsible air channel is formed in it. It will be understood that this construction, when in collapsed condition, permits the engaging beads $b$ to be pressed toward one another, and then forced into receiving grooves of the rim. The channel C, when inflated will further force the beads into said grooves and hold them securely in place. The channel C also serves as a pneumatic cushion under pressure imparted to the tread portion of the tire, and transmitted by the central load sustaining portion H and bridge G. The channel C is made with outwardly extending recesses $c$ on each side, forming the transversely arched bridge G, composed of solid sections or members $g, g'$, between the inner edges and walls of the annular voids F, F. The bridge G being placed at the inner end of the load sustaining portion H acts as a buffer under the thrust of the portion H when the tire strikes an obstacle in the roadway, or is otherwise subjected to undue pressure by a load. In case the channel C becomes wholly or partially deflated this inwardly curved bridge may be forced into contact with the opposite or inner wall of the channel and thus prevent undue flattening of the tire. The air channel C, being within an inward peripheral extension of the tire is almost wholly within the inner cavity of the clincher rim D and is not deep enough to permit any material flattening of the tire. No flattening, however, is liable to occur, for the following reason. When the middle portion of the arched bridge G is forced inwardly by pressure of a load on the tread portion, acting through the load sustaining portion H, the oblique sections $g, g'$, will be put under strain or tension and act to draw inwardly the opposite sides of the tire and overcome the tendency to spread or flatten. The diverging sections or members $g, g'$ serve, in connection with the central member H to suspend the load from a point inward or toward the hub of a wheel. This action of the bridge is largely due to its location adjacent to the inner air channel C at the inner periphery of the tire, and to the cooperative action of the middle load sustaining portion H which transmits pressure from the tread portion of the tire.

The voids F may be formed by cores of any suitable material when moulding the rubber compound and are made annular and elliptical or semi-elliptical in cross section with their long axes in approximately radial lines. They are arranged, one on each side of a central radial line of the tire, leaving between them a central load sustaining portion H extending from the tread portion to the bridge G. These voids may be of different widths and sizes according to the weight or load to be placed on the tire and the particular kind of vehicle on which the tire is to be used.

Having described my invention, what I claim, and desire to secure by Letters Patent, is:

A vehicle tire of the class described, comprising a body of the solid molded type, having an inner peripheral air channel, oppositely disposed diverging annular voids, elongated in cross section with their long axes extending approximately in radial lines, and providing a solid load sustaining portion between them, a transverse annular bridge between said air channel and the inner edges of said voids, and having end portions extending obliquely toward the sides and the tread of the tire, whereby in conjunction with said load sustaining portion, they will be placed under tension in the direction of their long axes and will suspend the load from the inner portion of said central load sustaining member and also exert an inward pull upon the side portions of the tire, under pressure of a load on the tread portion of the tire.

In testimony whereof, I affix my signature.

CLARENCE S. PRESTON.